United States Patent
Ni et al.

(10) Patent No.: US 9,544,550 B1
(45) Date of Patent: Jan. 10, 2017

(54) LOW POWER SURVEILLANCE CAMERA SYSTEM FOR INTRUDER DETECTION

(71) Applicant: HRL Laboratories, LLC, Malibu, CA (US)

(72) Inventors: Kang-Yu Ni, Calabasas, CA (US); Shankar R. Rao, Agoura Hills, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 296 days.

(21) Appl. No.: 14/209,136

(22) Filed: Mar. 13, 2014

Related U.S. Application Data

(60) Provisional application No. 61/783,538, filed on Mar. 14, 2013.

(51) Int. Cl.
*H04N 7/18* (2006.01)

(52) U.S. Cl.
CPC ..................................... *H04N 7/183* (2013.01)

(58) Field of Classification Search
None
See application file for complete search history.

(56) References Cited

U.S. PATENT DOCUMENTS

| | | | |
|---|---|---|---|
| 2004/0131249 A1* | 7/2004 | Sandrew | G06T 7/0036 382/162 |
| 2007/0183661 A1* | 8/2007 | El-Maleh | G06K 9/00234 382/173 |
| 2010/0067782 A1* | 3/2010 | Dunn | G06T 7/0081 382/162 |
| 2012/0027248 A1* | 2/2012 | Feris | G06K 9/00744 382/103 |

OTHER PUBLICATIONS

Ciocoiu. ("Foveated compressed sensing" 20th European conference on Circuit Theory and Design 2011.).*

Candes, E., et al., "Robust Principal Component Analysis?" IEEE PAMI 2011.

(Continued)

*Primary Examiner* — Kate Luo
(74) *Attorney, Agent, or Firm* — Tope-McKay & Associates

(57) ABSTRACT

Described is a low power surveillance camera system for intruder detection. The system observes a scene with a known camera motion to generate images with various viewing angles. Next, a background learning mode is employed to generate a low rank matrix for the background in the images. Background null space projections are then learned, which provide a foreground detection kernel. A new scene with known viewing angles is then obtained. Based on the foreground detection kernel and the new input image frame, low power foreground detection is performed to detect foreground potential regions of interest (ROIs), such as intruders. To filter out minimal foreground activity, the system identifies contiguous ROIs to generate the foreground ROI. Focus measures are then employed on the ROIs using foveated compressed sensing to generate foveated measurements. Based on the foveated measurements, the foreground is reconstructed for presentation to a user.

18 Claims, 5 Drawing Sheets

(56) References Cited

OTHER PUBLICATIONS

Chan T.F., et al., "Active contours without edges," IEEE Transactions on Image Processing. 10(2):266-277, 2001.
Goldstein, T., et al., "Geometric applications of the split bregman method: Segmentation and surface reconstruction," J. Sci. Comput., 45(1-3):272-293, 2010.
Nikolova, M., et al., "Algorithms for finding global minimizers of image segmentation and denoising models," SIAM J. App. Math., 66(5): 1632-1648, 2006.
Peng, Y., et al., "RASL: Robust Alignment by Sparse and Low-rank Decomposition for Linearly Correlated Images," IEEE PAMI, 2011.
Waters. A., et al., "SparCS: Recovering low-rank and sparse matrices from compressive measurements," NIPS, 2011.
Wright, J., et al., "Compressive Principle Component Pursuit," ISIT, 2012.
Yang, J., et al., "Alternating direction algorithms for Il-problems in compressive sensing" SIAM J. Sci. Comput., 33(1):250-278, 2011.
Zou, H., et al., "Regularization and variable selection via the elastic net," Journal of the Royal Statistical Society Series B, 67:301-320, 205, (2005).
E. Candes, X, Li, Y. Ma, and J. Wright, "Robust Principal Component Analysis?", IEEE PAMI 2011.
Y. Peng, A. Ganesh, J. Wright, W. Xu, and Y. Ma, "RASL: Robust Alignment by Sparse and Low-rank Decomposition for Linearly Correlated Images", IEEE PAMI 2011.
A. Waters, A. Sankaranarayanan, and R Baraniuk. SparCS: Recovering low-rank and sparse matrices from compressive measurements. NIPS. 2011.
J. Wright, A. Ganesh, K. Min, and Y, Ma. Compressive Principal Component Pursuit, ISIT. 2012.

\* cited by examiner

LOW POWER SURVEILLANCE CAMERA SYSTEM FOR INTRUDER DETECTION

CROSS-REFERENCE TO RELATED APPLICATIONS

This is a non-provisional patent application of U.S. Provisional Application No. 61/783,538, filed on Mar. 14, 2013, entitled, "Low Power Surveillance Camera for Intruder Detection."

FIELD OF INVENTION

The present invention relates to surveillance system and, more particularly, to a low power surveillance camera system for intruder detection.

BACKGROUND OF INVENTION

Surveillance cameras typically are stationary or have controllable motions, such as pan, tilt, and zoom. Therefore, the background scene can be considered stationary. Conventionally, surveillance videos are obtained by acquiring each pixel value (raster scan) of the scene with a stationary background over a long period of time. Such surveillance cameras create a massive amount of data and consume a lot of power. Since the background is stationary, power consumption can be reduced if only the moving foreground is measured. However, this is challenging because the location of the moving foreground can be arbitrary and usually unknown until the entire scene is acquired.

There are a few related works that detect foreground from a stationary background video. For example, the authors in Candes et al. show that the low-rank and sparse components of a matrix can be separated exactly by convex programming (see E. Candes, X. Li, Y. Ma, and J. Wright, "Robust Principal Component Analysis?", IEEE PAMI 2011). They demonstrate this in a video surveillance application in which they stack video frames as columns of a matrix, which can be decomposed into a low-rank component that represents the stationary background and a sparse component that represents moving objects. The process proposed by Candes et al. is entirely post-processing.

In Peng et al., Candes et al.'s work was extended by simultaneously aligning a batch of images that are linearly correlated and with corruption such as occlusion (see Y. Peng, A. Ganesh, J. Wright, W. Xu, and Y. Ma, "RASL: Robust Alignment by Sparse and Low-rank Decomposition for Linearly Correlated Images", IEEE PAMI 2011). Each column of the matrix, which is an image, finds an optimal transform so that the matrix can be decomposed into a low-rank component and a sparse component. This is also post processing and does not involve video acquisition.

Two groups have investigated the problem of low-rank and sparse recovery from compressive measurements. For example, Waters et al. introduced an effective alternating minimization algorithm for compressive low-rank and sparse recovery (see A. Waters, A. Sankaranarayanan, and R. Baraniuk. SparCS: Recovering low-rank and sparse matrices from compressive measurements. NIPS, 2011). Additionally, Wright et al. developed theoretical conditions under which compressive low-rank and sparse recovery can be solved with a convex optimization (see J. Wright, A. Ganesh, K. Min, and Y. Ma. Compressive Principal Component Pursuit, ISIT, 2012). However, these background modeling methods for compressive low-rank and sparse recovery can only process multiple video frames in batch fashion, limiting their application to real time video surveillance and are not designed to reduce the power consumption of the imaging system.

Thus, a continuing need exists for an efficient surveillance system that detects interesting targets and intruders without acquiring massive surveillance video data.

SUMMARY OF INVENTION

Described is a system, method, and computer program product for a low power surveillance camera system for intruder detection. The system, for example, includes one or more processors and a memory. The memory is a non-transitory computer-readable medium having executable instructions encoded thereon, such that upon execution of the instructions, the one or more processors performs several operations, such as receiving a series of frames from a camera, each frame having a background and a foreground; generating a background template from the series of frames; receiving a new image frame of the scene, the new image frame having a background and a foreground; detecting an intruder image in the foreground of the new image frame; and combining the intruder image with the background template to reconstruct the foreground.

In another aspect, detecting an intruder image in the foreground of the new image frame further comprises operations of detecting potential regions of interest (ROI) in the foreground of the new image frame; identifying contiguous ROI in the potential ROI; and reconstructing the ROI using foveated compressive sensing to generate the intruder image.

Further, in receiving a series of frames from a camera, the series of frames include a collection of images with various known viewing angles.

Additionally, in generating a background template from the series of frames, each frame is stacked as a column vector of data matrix D, which is decomposed to $D=A+E$, where A is a low-rank matrix that represents the background and E is a sparse matrix that represents the foreground.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
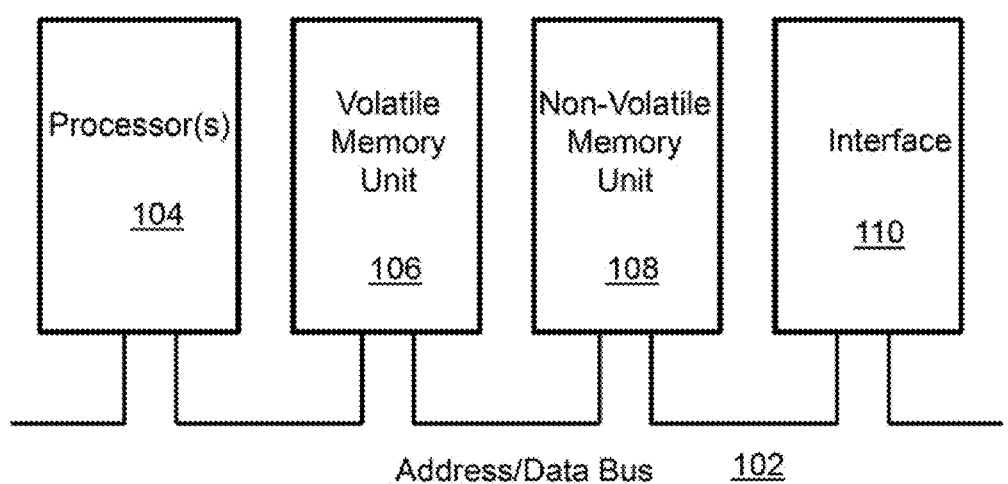
FIG. 1 is a block diagram depicting the components of a camera system according to the principles of the present invention.
Figure 1:
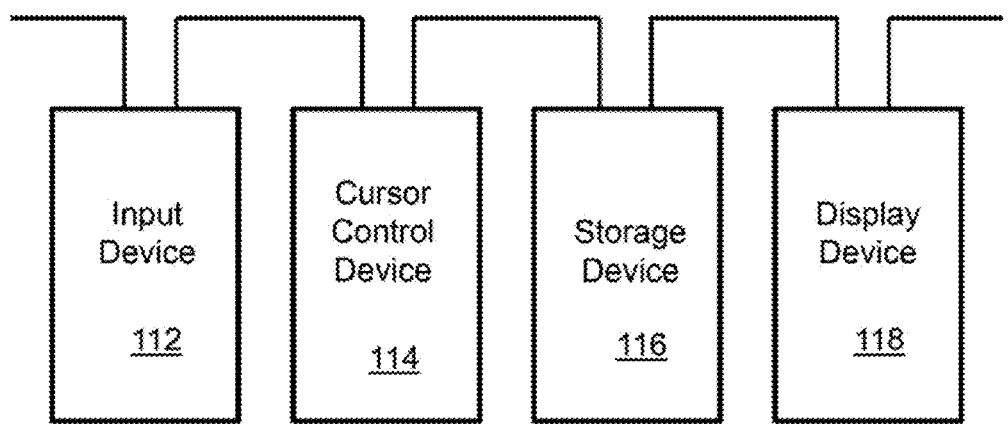

The present invention relates to surveillance system and, more particularly, to a low power surveillance camera system for intruder detection. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Next, specific details of the present invention are provided to give an understanding of the specific aspects. Finally, experimental results are provided as an example of the system in operation.

(2) Principal Aspects

The present invention has three "principal" aspects. The first is a surveillance system. The system is typically in the form of a computer system operating software or in the form of a "hard-coded" instruction set. This system may be incorporated into a wide variety of devices that provide different functionalities. The second principal aspect is a computer implemented method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as a video camera or any other sensor as may be applicable or desired for a surveillance system. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
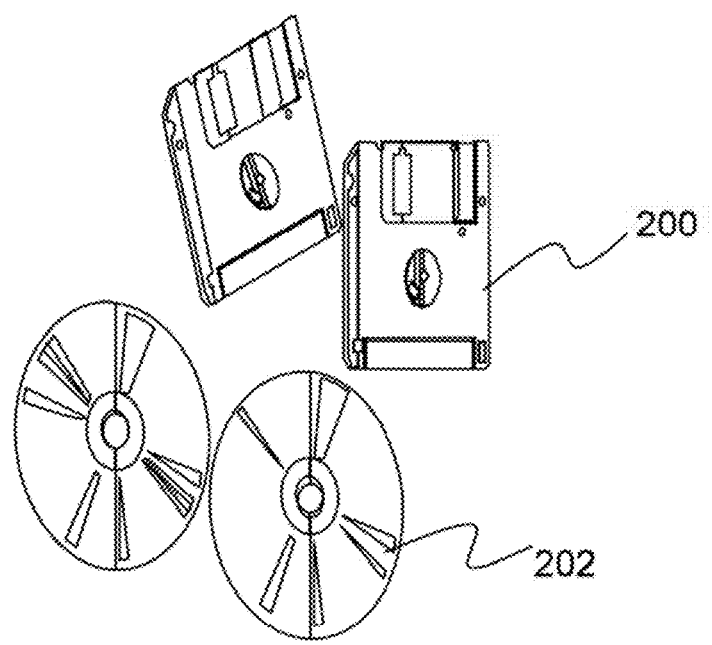
FIG. 2 is an illustration of a computer program product embodying an aspect of present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The present invention is directed to a lower power surveillance system that is operable for detecting interesting targets and intruders without acquiring massive surveillance video data. Specifically, the surveillance system is designed to detect a moving foreground without acquiring individual pixel values and reduce power consumption, while using the knowledge of the stationary background.

The low power surveillance system includes a framework that builds upon sparse and low rank decomposition (SLRD) and compressed sensing (CS). The framework enables the system to not only detect and track moving foreground with low power but also provide efficient data storage. In doing so, the system monitors a wide surveillance area with low power that is proportional to the size of an intruder, instead of the size of the surveillance area. To provide for such functionality, the system incorporates three unique aspects, including: (1) a background learning module that allows camera motion and learns the background; (2) a low power foreground (intruder) detection module that incorporates the knowledge of the background; and (3) a foveated compressed sensing module that reconstructs intruders in high-resolution with much reduced measurements. These aspects are described in further detail below.

(4) Specific Details of the Invention

Figure 3:
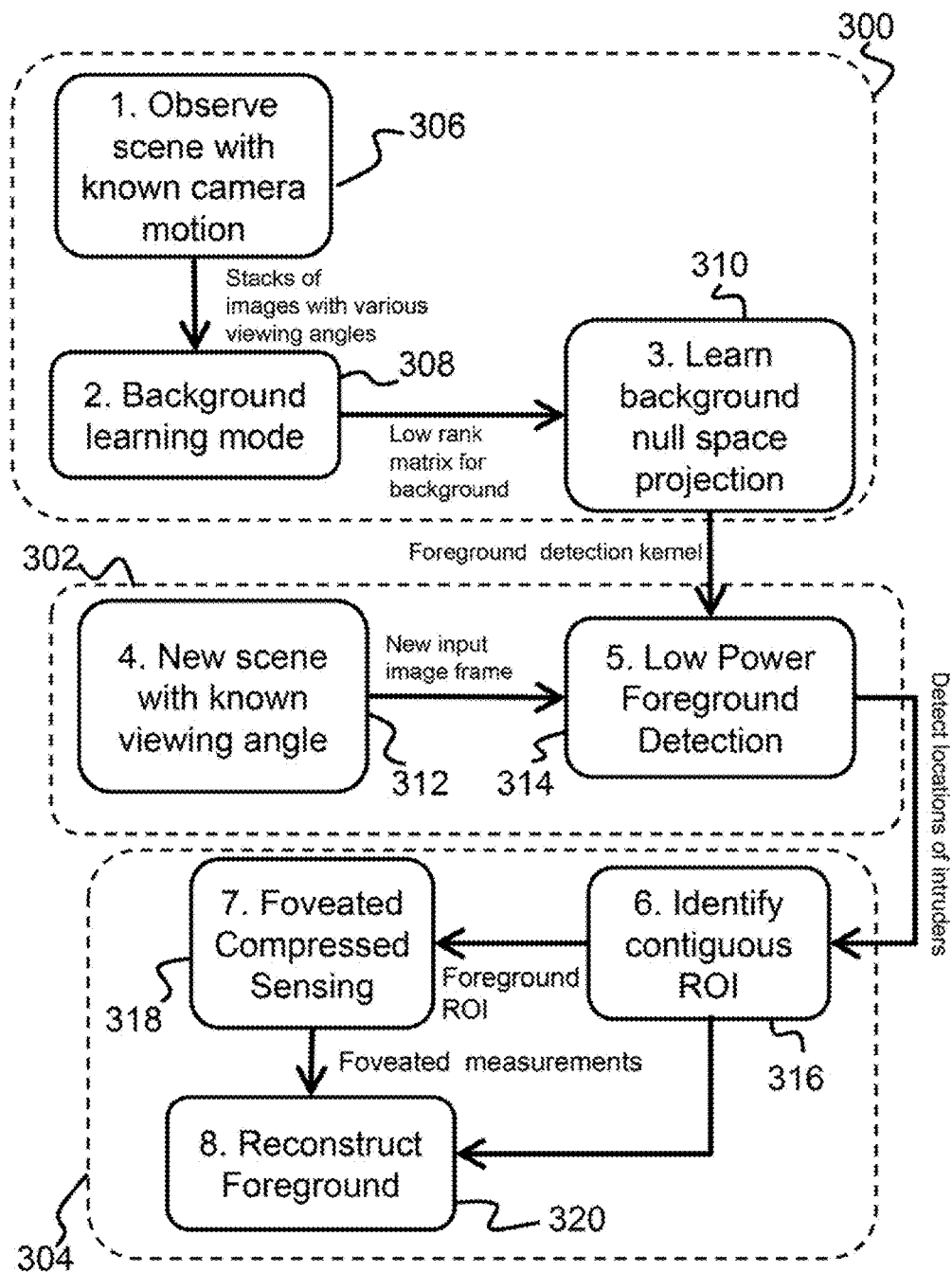
FIG. 3 is a flow chart depicting process flow of a low power surveillance system according to the principles of the present invention.

As noted above and as illustrated in FIG. 3, the system includes three modules, depicted as background learning module 300, a low power foreground detection mode 302, and a foveated compressed sensing module 304.

In operation, the system proceeds through the following steps to detect intruders. First, using a sensor (e.g., camera) the system observes 306 the scene with a known camera motion (such as pan and tilt) to generate images with various viewing angles. Next, a background learning mode 308 is employed to generate a low rank matrix for the background in the images. The background null space projections are then learned 310, which, as a result, provides a foreground detection kernel. A new scene with known viewing angles is then obtained 312. For example, a new video stream is received into the system with a new input image frame. Based on the foreground detection kernel and the new input image frame, low power foreground detection 314 can be performed to detect foreground potential regions of interest (ROIs), such as intruders or other anomalous activity.

To filter out minimal foreground activity, the system identifies 316 contiguous ROIs to generate the foreground ROI. Focus measures are then employed on the ROIs using foveated compressed sensing 318 to generate foveated measurements. Based on the foveated measurements, the foreground is reconstructed 320 for presentation to a user. Each of these processes are described in further detail below.

(4.1) Background Learning Module

Sparse and low-rank decomposition (SLRD) is a set of provably optimal and efficient mathematical techniques for identifying and decomposing low-complexity structure of a scene from high-dimensional raw data. Such a technique was described in E. Candes, X. Li, Y. Ma, and J. Wright, "Robust Principal Component Analysis?", IEEE PAMI 2011, which is incorporated by reference as though fully set forth herein.

The example below describes how a sequence of images from a stationary camera can be embedded in a data matrix D that satisfies the sparse/low-rank decomposition criteria specified by Candes et al., and thus the system of the present invention can implement the algorithm (PCP) to separate the background template A from the sparse errors E. Suppose, for example, that a stationary camera is viewing a scene for the task of intruder/foreground detection. If a large number of raw image frames are obtained over the course of a day, each frame can be stacked as a column vector of the data matrix D, which can be decomposed to D=A+E, where A is the low-rank matrix that represents the background and E is the sparse matrix that represents the sparse foreground and deviations from the convex Lambertian model, e.g., shadows and reflection. The low-rank matrix A is extremely low-rank relative to the image size, the size of the columns in D. For the convex Lambertian model, Basri and Jacobs proved that rank(A)≤9. Basri and Jacobs described the Lambertian model in "Lambertian Reflectance and Linear Subspaces," IEEE, TPAMI, 2003, which is hereby incorporated by reference as though fully set forth herein. In other words, for most stationary scenes, the data matrix D described above can be well approximated by the sum of a low-rank matrix A that models the illumination conditions and a sparse matrix E modeling deviations from our illumination model (shadows and reflections).

The low-rank (i.e., matrix A) and sparse components (i.e., sparse matrix E) of the data matrix D can be exactly decomposed by the following convex optimization, Principal Component Pursuit (PCP):

$$\text{argmin}_{A,E} \|A\|_* + \lambda \|E\|_1, \text{ such that } D=A+E, \quad (1)$$

where $\|A\|_*$ is the nuclear norm of or the sum of the singular values of A and $\|E\|_1$ is the $l_1$ norm or the absolute sum of the entries of E. PCP minimizes a weighted combination of the nuclear norm and the $l_1$ norm, among all feasible decompositions. The minimizer A provides a background template for a stationary camera.

If the camera is not stationary, the images need to be aligned in order to have a low-rank and sparse decomposition. Aligning the images can be solved by the following nonlinear optimization problem, Robust Alignment by Sparse and Low-rank Decomposition (RASL):

$$\text{argmin}_{A,E,\tau} \|A\|_* + \lambda \|E\|_1 \text{ such that } D \circ \tau = A+E, \quad (2)$$

where $\tau$ is a set of transformations that align the images in D. A non-limiting example of such non-linear optimization problem was described by Y. Peng, A. Ganesh, J. Wright, W. Xu, and Y. Ma, "RASL: Robust Alignment by Sparse and Low-rank Decomposition for Linearly Correlated Images", IEEE PAMI 2011, which is hereby incorporated by reference as though fully set forth herein.

This technique has been successful in aligning batches of images to get the background when the images are not aligned. To solve equation (2), the transformations τ need to have good initializations. With respect to the present invention, since the camera motion is known, i.e. pan, tilt, and zoom are controllable; τ is a known variable, which simplifies the problem.

Thus, the background template is the matrix A obtained by using RASL to solve the optimization problem stated in Equation (2).

Suppose the system learned the background A from D using PCP or RASL. Let Q be the null space of A and $P_Q$ the projection matrix onto Q. Then, for a single raw image d, the measurements are $P_Q d = P_Q(a+e) = P_Q a + P_Q e = P_Q e$, where a and e are the low-rank background and sparse component, respectively. Therefore, the image is sparse in the projection matrix $P_Q$ representation, since e is the sparse component. The proposed measurement matrix is then $\Phi=\Psi P_Q$, where $\Psi$ can be any CS matrix that is well conditioned, such as satisfying the restricted isometry property, which guarantees a unique sparse solution. For numerical efficiency, $\Psi$ can be chosen to be a subsampled Fourier matrix. Note that $\Phi=\Psi P_Q$ is close to well conditioned because the projection matrix $P_Q$ onto the high-dimensional null space of A is close to the identity matrix, that is, the diagonal entries of $P_Q$ are close to one, and the off-diagonal entries of $P_Q$ are close to zero. The null space projection provides a transformation that subtracts of the background when applied to new images of the same scene, leaving on the foreground pixels of interest as nonzero.

(4.2) Low Power Foreground Detection Module

Low-power foreground detection is performed by obtaining the measurements y=Φd, whose dimension is much smaller than the dimension of d. Since y=Φd=Φa+Φe=Φe, the foreground is detected using the following convex optimization:

$$\min_e \|\Phi e - y\|_2 + \alpha \|e\|_1, \quad (3)$$

where the $l_1$ norm and $l_2$ norm are defined for a vector X as $$\|x\|_2 \equiv \sqrt[2]{\sum_i x_i^2}$$

and $\|X\|_1 \equiv \Sigma_i |x_i|$, respectively. This can be solved quickly by methods such as YALL1 and DALM. YALL1 is Your Algorithms for L1, a solver for sparse reconstruction available for download at yall1.blogs.rice.edu and DALM is the method of Dual Augmented Lagrange Multipliers, another solver for sparse reconstruction available for download at http://www.eecs.berkeley.edu/~yang/software/l1benchmark/index.html. As understood by those skilled in the art, y is a vector of measurements of the input image and x is a variable used in the definition of the l1 and l2 norms above.

A major benefit of the foreground detection method according to the principles of the present invention is that the number of measurements is proportional to the size of the intruder (the size of the support of e) and does not depend on the size of the surveillance area (the size of d). This requires a compressive sensing camera, such as the one manufactured by InView Technology Corp., that implements Φ in the optical domain in order to reduce the number of measurements. InView Technology is located at 8900 Shoal Creek Blvd, Suite 125, Austin, Tex. 78757, USA.

Alternatively, the system can utilize a conventional camera to implement Φ digitally from full measurements. Although utilizing a conventional camera (as opposed to a compressive sensing camera) does not provide the benefit of reducing the number of measurements, it still provides the advantage of reducing the amount of information that needs to be transmitted over the network to reduce the data storage needs. Moreover, the advantage of using SLRD in terms of better quality foreground by incorporating structural knowledge of the background scene still holds true.

(4.3) Foveated Compressed Sensing Module

It is desirable to reduce foreground noise. Thus, the system identifies contiguous ROI to avoid getting isolated pixels in the sparse component. In doing so, let S=supp(e) denote the support of the sparse component e and let $\|S\|_{TV} = \Sigma_{i,j} |(\nabla S)_{i,j}|$ denote the total variation of S. This penalizes isolated pixels and favors contiguous regions.

The contiguity prior is added to the foreground detection problem as presented in equation (3) as the following:

$$\min_e \|\Phi e - y\|_2 + \alpha \|e\|_1 + \lambda \|S\|_{TV}, \quad (4)$$

thereby identifying the desired foreground region of interest as the pixels corresponding to nonzero entries of the sparse component e.

Once the sparse component e is obtained from the reduced measurements y, the scene image can be reconstructed by adding the background template to the sparse component. Although not required, it may be desirable to get a higher resolution or precision of the foreground. Thus, in order to do so, the system employs a compression technique, such as a foveated compressed sensing (FCS) technique. A non-limiting example of such a technique was described in U.S. Provisional Application No. 61/780,716, filed on Mar. 13, 2013, and entitled, "Foveated Compressive Sensing System," which is hereby incorporated by reference as though fully set forth herein.

Using foveated compressive sensing, the system constructs an ROI mask M from e or S from equation (4) and then takes the following FCS measurements: y=ΨMd. The ROI of d can be accurately reconstructed if image d has a sparse representation in some dictionary Θ, i.e. d=Θx and x is sparse. The ROI is then reconstructed by the following minimization:

$$\min_x \|\Psi M \Theta x - y\|_2 + \alpha \|x\|_1. \quad (5)$$

Alternatively, the system can perform a non-compressive sensing (CS) foveation with a "conventional" imaging complementary metal-oxide semiconductor (CMOS) camera that implements foveation using programmable windowing (user-programmable regions of interests available as a feature in camera hardware).

The difference between FCS and non-CS foveation is that the former reduces the number of measurements and compresses the data by transmitting only the high resolution ROIs over the network, while the latter does not reduce the number of measurements but still compresses the data by transmitting only ROIs.

After performing either the FCS or non-CS foveation, the end result is a reconstructed foreground, which is displayed to the user for identification or provided to other systems for further processing. As a non-limiting example, the reconstructed foreground is an image in which the sparse component e is superimposed over the background template A (as generated per Section 4.1).

(5) Experimental Results

Figure 4A:
FIG. 4A is an illustration depicting an background template A.
Figure 4B:
FIG. 4B is an illustration depicting an input image with intruders (d)

FIGS. 4A through 4D illustrate experimental results of the low-power surveillance system as taken from a parking lot surveillance video. First, the background was trained with 50 frames to generate the background template A, which is illustrated in FIG. 4A. The resolution of each frame was 480×704 pixels, and thus a conventional camera would have to make 337920 pixel intensity measurements for each frame. Therefore, the size of the data matrix D was 337920× 50. In this video example, the camera was stationary and in the 50 frames that were used for training, there was no foreground movement. Therefore, the foreground was learned using PCA. From the SVD decomposition, $D = U\Sigma V^T$, it was observed that the diagonal entries rapidly decreased from the first two entries. Thus, the background template A=U(:,1:2), is a submatrix with the first two columns of U.

The projection matrix onto the null space was then $P_Q = I - AA^T$. For a new frame d with intruders (shown as FIG. 4B), 30% of pixel intensity measurements were taken: y=ΨP_Qd, where Ψ was a subsampled Fourier matrix with size 101376×337920.

Figure 4C:
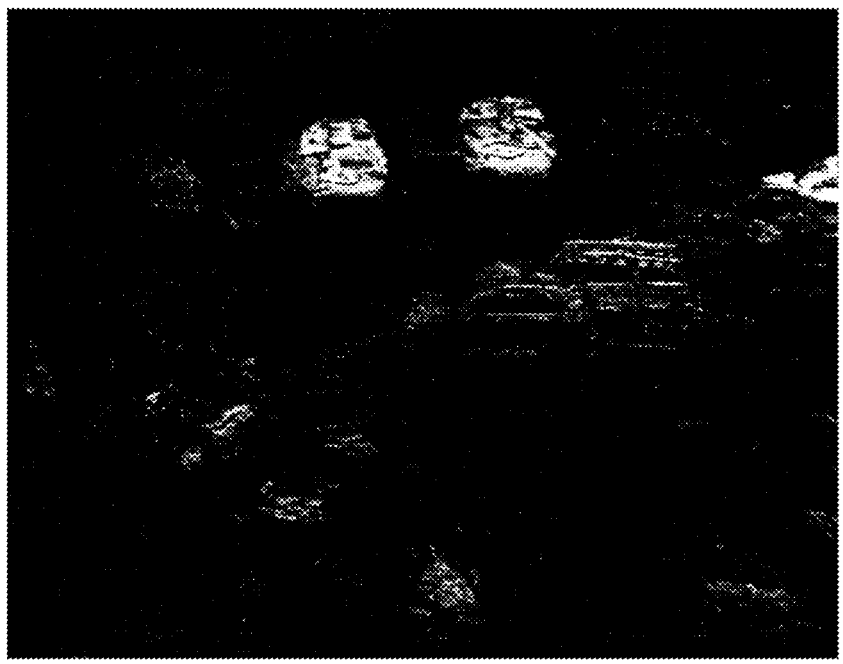
FIG. 4C is an illustration depicting foreground detection of intruder e.
Figure 4D:
FIG. 4D is an illustration depicting a reconstructed foreground.

As depicted in FIG. 4C, the intruder (e) was then detected through implementation of equation (3). As shown, all three cars that were not present in the training video of FIG. 4A were clearly detected in FIG. 4C and reconstructed in FIG. 4D. Thus, as can be appreciated, the present invention provides an efficient low power surveillance camera system for intruder detection.

What is claimed is:

1. A low power surveillance system, the system comprising:
    one or more processors and a memory, the memory having executable instructions encoded thereon, such that upon execution of the instructions, the one or more processors performs operations of:
        receiving a series of frames from a camera, each frame having a background and a foreground;
        generating a background template from the series of frames;
        receiving a new image frame of the scene, the new image frame having a background and a foreground;
        detecting an intruder image in the foreground of the new image frame;
        combining the intruder image with the background template to reconstruct the foreground; and
        wherein in detecting an intruder image in the foreground, the foreground is detected using a convex optimization, as follows:

$$\min_e \|\Phi e - y\|_2 + \alpha \|e\|_1,$$

where Φ denotes a measurement matrix, and where e denotes a sparse component in the new image frame d, where y=Φd, and where α denotes a low rank backround.

2. The system as set forth in claim 1, wherein detecting an intruder image in the foreground of the new image frame further comprises operations of:
    detecting potential regions of interest (ROI) in the foreground of the new image frame;
    identifying contiguous ROI in the potential ROI; and
    reconstructing the ROI using foveated compressive sensing to generate the intruder image.

3. The system as set forth in claim 2, wherein in receiving a series of frames from a camera, the series of frames include a collection of images with various known viewing angles.

4. The system as set forth in claim 3, wherein in generating a background template from the series of frames, each frame is stacked as a column vector of data matrix D, which is decomposed to D=A+E, where A is a low-rank matrix that represents the background and E is a sparse matrix that represents the foreground.

5. The system as set forth in claim 1, wherein in receiving a series of frames from a camera, the series of frames include a collection of images with various known viewing angles.

6. The system as set forth in claim 1, wherein in generating a background template from the series of frames, each frame is stacked as a column vector of data matrix D, which is decomposed to D=A+E, where A is a low-rank matrix that represents the background and E is a sparse matrix that represents the foreground.

7. A computer program product stored on the non-transitory computer-readable medium for a low power surveillance system, the computer program product comprising:
a non-transitory computer-readable medium having executable instructions, such that upon execution of the instructions by one or more processors, the one or more processors perform operations of:
receiving a series of frames from a camera, each frame having a background and a foreground;
generating a background template from the series of frames;
receiving a new image frame of the scene, the new image frame having a background and a foreground;
detecting an intruder image in the foreground of the new image frame;
combining the intruder image with the background template to reconstruct the foreground; and
wherein in detecting an intruder image in the foreground, the foreground is detected using a convex optimization, as follows:

$$\min_{e}\|\Phi e - y\|_2 + \alpha\|e\|_1,$$

where $\Phi$ denotes a measurement matrix, and where e denotes a sparse component in the new image frame d, where y=$\Phi$d, and where $\alpha$ denotes a low rank background.

8. The computer program product as set forth in claim 7, wherein detecting an intruder image in the foreground of the new image frame further comprises operations of:
detecting potential regions of interest (ROI) in the foreground of the new image frame;
identifying contiguous ROI in the potential ROI; and
reconstructing the ROI using foveated compressive sensing to generate the intruder image.

9. The computer program product as set forth in claim 8, wherein in receiving a series of frames from a camera, the series of frames include a collection of images with various known viewing angles.

10. The computer program product as set forth in claim 9, wherein in generating a background template from the series of frames, each frame is stacked as a column vector of data matrix D, which is decomposed to D=A+E, where A is a low-rank matrix that represents the background and E is a sparse matrix that represents the foreground.

11. The computer program product as set forth in claim 7, wherein in receiving a series of frames from a camera, the series of frames include a collection of images with various known viewing angles.

12. The computer program product as set forth in claim 7, wherein in generating a background template from the series of frames, each frame is stacked as a column vector of data matrix D, which is decomposed to D=A+E, where A is a low-rank matrix that represents the background and E is a sparse matrix that represents the foreground.

13. A computer implemented method for a low power surveillance system, the method comprising an act of:
causing one or more processors to execute instructions encoded on a non-transitory computer-readable medium, such that upon execution, the one or more processors perform operations of:
receiving a series of frames from a camera, each frame having a background and a foreground;
generating a background template from the series of frames;
receiving a new image frame of the scene, the new image frame having a background and a foreground;
detecting an intruder image in the foreground of the new image frame; and
combining the intruder image with the background template to reconstruct the foreground; and
wherein in detecting an intruder image in the foreground, the foreground is detected using a convex optimization, as follows:

$$\min_{e}\|\Phi e - y\|_2 + \alpha\|e\|_1,$$

where $\Phi$ denotes a measurement matrix, and where e denotes a sparse component in the new image frame d, where y=$\Phi$d, and where $\alpha$ denotes a low rank background.

14. The method as set forth in claim 13, wherein detecting an intruder image in the foreground of the new image frame further comprises operations of:
detecting potential regions of interest (ROI) in the foreground of the new image frame;
identifying contiguous ROI in the potential ROI; and
reconstructing the ROI using foveated compressive sensing to generate the intruder image.

15. The method as set forth in claim 14, wherein in receiving a series of frames from a camera, the series of frames include a collection of images with various known viewing angles.

16. The method as set forth in claim 15, wherein in generating a background template from the series of frames, each frame is stacked as a column vector of data matrix D, which is decomposed to D=A+E, where A is a low-rank matrix that represents the background and E is a sparse matrix that represents the foreground.

17. The method as set forth in claim 13, wherein in receiving a series of frames from a camera, the series of frames include a collection of images with various known viewing angles.

18. The method as set forth in claim 13, wherein in generating a background template from the series of frames, each frame is stacked as a column vector of data matrix D, which is decomposed to D=A+E, where A is a low-rank matrix that represents the background and E is a sparse matrix that represents the foreground.

* * * * *